US009030722B2

(12) United States Patent
Matsuura

(10) Patent No.: US 9,030,722 B2
(45) Date of Patent: May 12, 2015

(54) LIGHT SOURCE APPARATUS AND OPTICAL SCANNER

(75) Inventor: Taizo Matsuura, Ama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 135 days.

(21) Appl. No.: 12/968,723

(22) Filed: Dec. 15, 2010

(65) Prior Publication Data

US 2011/0157669 A1    Jun. 30, 2011

(30) Foreign Application Priority Data

Dec. 25, 2009    (JP) .................... 2009-294299

(51) Int. Cl.
    *G02B 26/10*     (2006.01)
    *G02B 26/12*     (2006.01)

(52) U.S. Cl.
    CPC .................... *G02B 26/124* (2013.01)

(58) Field of Classification Search
    CPC ............... G02B 26/10–26/129; G02B 26/124
    USPC ............................. 359/196.1–226.2
    See application file for complete search history.

(56) References Cited

U.S. PATENT DOCUMENTS

| 5,943,153 | A  | * | 8/1999  | Naiki et al. ........... 359/210.1 |
| 6,975,441 | B2 | * | 12/2005 | Iizuka ................ 359/205.1 |
| 7,218,432 | B2 | * | 5/2007  | Ichii et al. .......... 359/204.4 |
| 2003/0072065 | A1 | * | 4/2003 | Suzuki et al. ......... 359/196 |

FOREIGN PATENT DOCUMENTS

JP    2001-311892    11/2001

* cited by examiner

*Primary Examiner* — Thomas K Pham
*Assistant Examiner* — Cara Rakowski
(74) *Attorney, Agent, or Firm* — Banner & Witcoff, Ltd.

(57) ABSTRACT

A light source apparatus includes a semiconductor laser which emits a laser beam, a coupling lens which converts the laser beam emitted from the semiconductor laser into a light flux, and a cylindrical lens into which the light flux is allowed to come from the coupling lens. The cylindrical lens is integrally formed with a lens portion, an outer circumferential portion which is arranged at an outer circumference of the lens portion, and a support portion which extends from the outer circumferential portion toward the semiconductor laser and which supports the coupling lens.

19 Claims, 5 Drawing Sheets

LIGHT SOURCE APPARATUS AND OPTICAL SCANNER

CROSS REFERENCE TO RELATED APPLICATION

The present application claims priority from Japanese Patent Application No. 2009-294299, filed on Dec. 25, 2009, the disclosure of which is incorporated herein by reference in its entirety.

BACKGROUND OF THE INVENTION

1. Field of the Invention

The present invention relates to a light source apparatus and an optical scanner including the light source apparatus.

2. Description of the Related Art

When a light source apparatus, which includes a semiconductor laser, a coupling lens, and a cylindrical lens, is assembled, it is necessary that the optical axes of the coupling lens and the cylindrical lens should be coincident with the optical axis of the semiconductor laser.

As shown in FIGS. 7A and 7B, a conventional light source apparatus 200 includes a semiconductor laser 210, a coupling lens 220, and a cylindrical lens 230. The light source apparatus 200 is assembled by fixing these respective parts to a base 250. In particular, the coupling lens 220 is fixed by the adhesion at a predetermined position in a barrel 225. Subsequently, the barrel 225 including the fixed coupling lens 220 fixed thereto and the cylindrical lens 230 are fixed to the base 250 by means of a method such as the adhesion or the like. The semiconductor laser 210 is fixed to a circular opening 262 of a holder 260 by means of, for example, the press-in or forcible insertion, and then the holder 260 is adhered to the base 250. Accordingly, the light source apparatus 200 is assembled. In this procedure, the high accuracy is required especially for the positional adjustment and the fixation of the coupling lens 220 and the semiconductor laser 210. Any deviation of the optical axis of the semiconductor laser 210 or the coupling lens 220 immediately affects the light condensing accuracy (light collecting accuracy, or light converging accuracy) of the light source apparatus.

Japanese Patent Application Laid-open No. 2001-311892 also discloses a similar light source apparatus, wherein a coupling lens is fixed to a first holding member (LD base), a cylindrical lens is fixed to a second holding member (holder), and the first holding member and the second holding member are fixed.

However, in the case of the conventional light source apparatus, a plurality of holding members are provided between the coupling lens and the cylindrical lens. Therefore, a problem arises such that the error is increased, and any desired light condensing accuracy is not obtained with the laser beam emitted from the light source.

SUMMARY OF THE INVENTION

The present invention has been made taking the foregoing background into consideration, an object of which is to provide a light source apparatus and an optical scanner in which the light condensing accuracy is high with respect to the laser beam emitted from a light source.

According to a first aspect of the present invention, there is provided a light source apparatus including:
a semiconductor laser which emits a laser beam;
a coupling lens which converts the laser beam emitted from the semiconductor laser into a light flux; and
a cylindrical lens into which the light flux from the coupling lens enter, the cylindrical lens including:
a lens portion;
an outer circumferential portion which is arranged at an outer circumference of the lens portion; and
a support portion which extends from the outer circumferential portion toward the semiconductor laser and which supports the coupling lens, wherein the cylindrical lens is integrally formed with the lens portion, the outer circumferential portion, and the support portion.

According to a second aspect of the present invention, there is provided an optical scanner which performs scanning with a laser beam, including:
the light source apparatus as defined in the light source apparatus of the first aspect of the present invention which emits the light flux of the laser beam;
an optical deflector which performs scanning with the light flux; and
a scanning lens which performs imaging with the light flux.

According to the light source apparatus and the optical scanner as defined above, the coupling lens is directly supported by the cylindrical lens without allowing any holding member to intervene. Therefore, the coupling lens and the cylindrical lens can be positionally adjusted within a range of small error. The semiconductor laser is positionally adjusted with respect to the lenses. Therefore, it is possible to provide the light source apparatus and the optical scanner in which the condensing accuracy (concentrating accuracy collecting accuracy, or converging accuracy) is high in relation to the laser beam emitted from the semiconductor laser.

According to the present invention, it is possible to provide the light source apparatus and the optical scanner in which the light condensing accuracy of the laser beam emitted from the light source is high.

BRIEF DESCRIPTION OF THE DRAWINGS

FIGS. 7A and 7B illustrate a conventional optical scanner, wherein FIG. 7A shows an exploded perspective view, and FIG. 7B shows a perspective view illustrating a state in which the optical scanner is assembled.

DESCRIPTION OF THE PREFERRED EMBODIMENTS

Schematic Arrangement of Laser Printer

Figure 1:
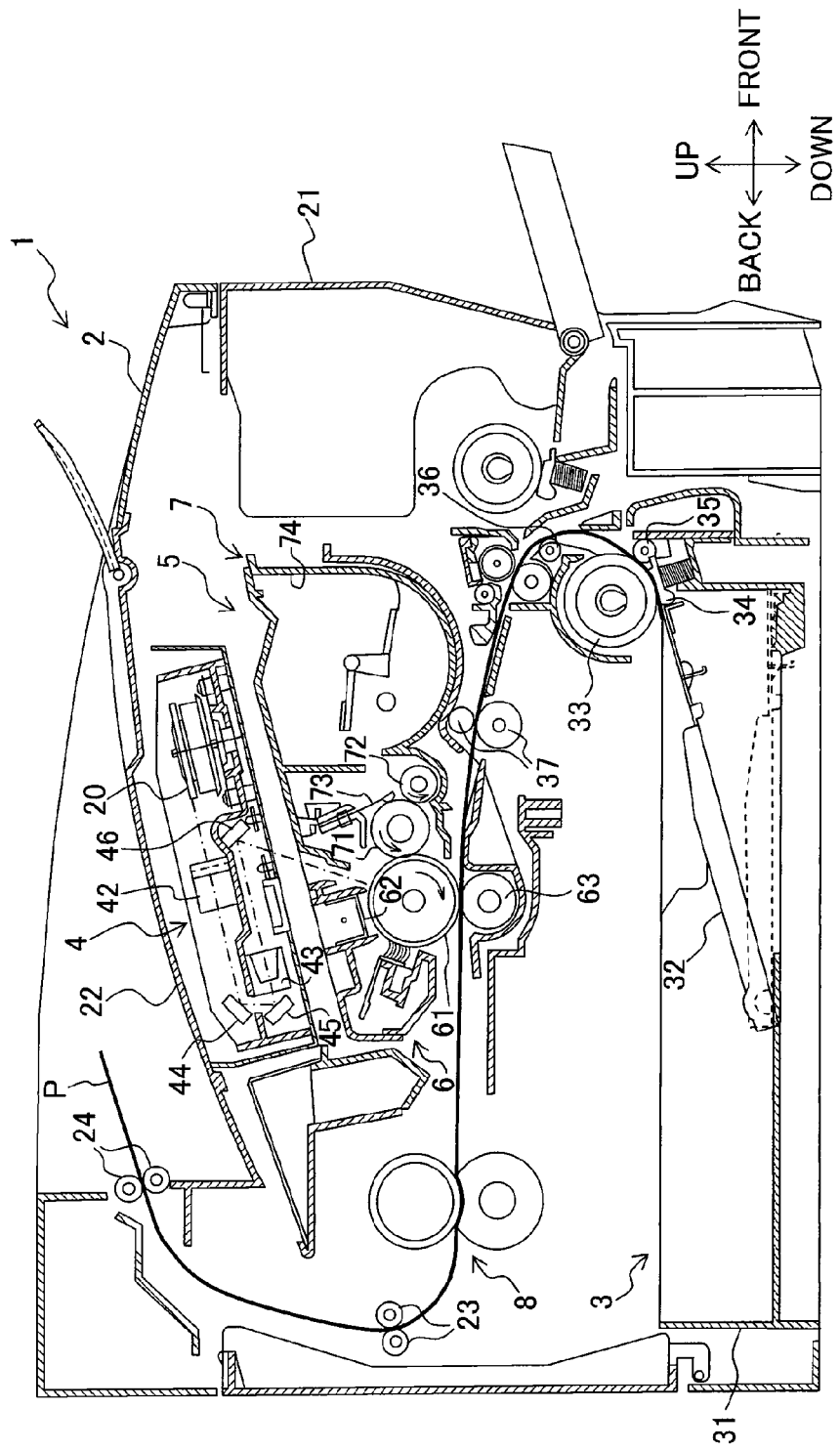
FIG. 1 shows a side sectional view illustrating a laser printer provided with an optical scanner of an embodiment of the present invention.

As shown in FIG. 1, those principally provided in a casing 2 of a laser printer 1 include a paper feed section 3 which supplies the recording paper P as an example of recording sheets, an optical scanner 4, a process cartridge 5 which transfers a toner image (developer image) onto the recording paper P, and a fixing apparatus 8 which thermally fixes the toner image on the recording paper P.

In the following description, the directions are defined on the basis of a user who uses the laser printer. That is, the right side as shown in FIG. 1 is designated as "front", the left side is designated as "back", the front side is designated as "left", and the deep side is designated as "right". The up-down direction as viewed in FIG. 1 is designated as "up/down".

The paper feed section 3 principally includes a paper feed tray 31 which is provided at a lower portion in the casing 2 and which accommodates the recording paper P, a recording paper pressing plate 32 which lifts the front side of the recording paper P, a paper feed roller 33, a paper feed pad 34, paper powder removing rollers 35, 36, and a resist roller 37. The recording paper P, which is accommodated in the paper feed tray 31, is allowed to approach the paper feed roller 33 by means of the recording paper pressing plate 32. The sheets of the recording paper P are separated one by one by the paper feed roller 33 and the paper feed pad 34. The recording paper P is allowed to pass along the paper powder removing rollers 35, 36 and the resist roller 37, and the recording paper P is transported toward the process cartridge 5.

Figure 2:
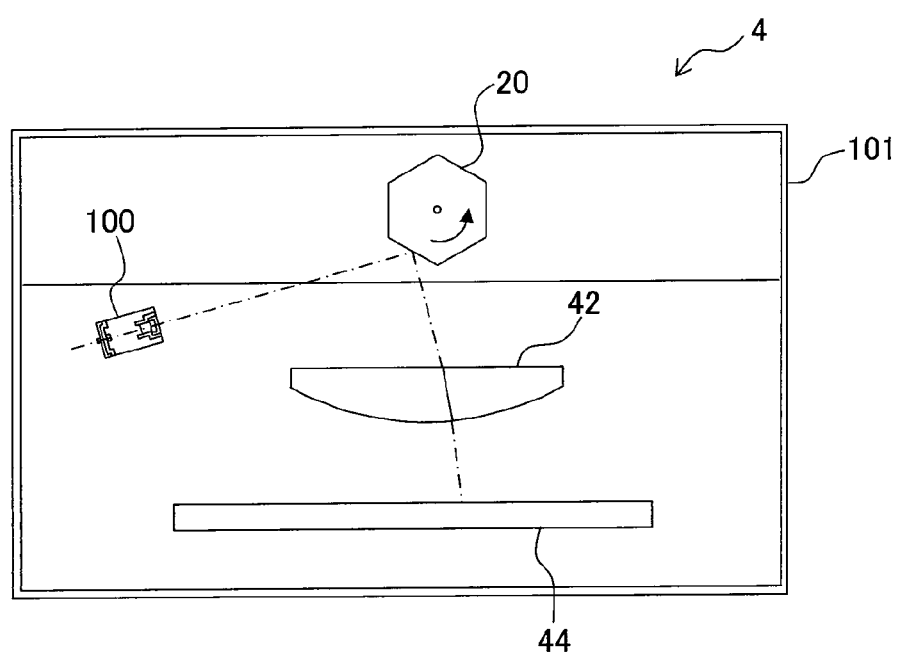
FIG. 2 shows a plan view illustrating the optical scanner.

The optical scanner 4 is provided at an upper portion in the casing 2. As shown in FIG. 2, the optical scanner 4 is provided with a light source apparatus 100, a polygon mirror 20, an fθ lens 42, and a reflecting mirror 44. The polygon mirror 20 has a hexagon shaped member and mirrors which are formed on portions of respective sides of the hexagon shaped member. The laser beam which is allowed to pass through the cylindrical lens 130 is reflected by the polygon mirror 20 while the polygon mirror 20 is rotated. Accordingly, the laser beam is subjected to the deflection and the scanning in a predetermined direction. The direction, in which the laser beam is subjected to the scanning by the polygon mirror 20, is defined as "main scanning direction". The fθ lens 42 converts the laser beam which is subjected to the scanning at an equal or constant angular velocity into the laser beam which is subjected to the scanning at an equal or constant velocity. At the same time, the laser beam is subjected to the imaging on a surface of a photosensitive drum 61 by the fθ lens 42.

As shown in FIG. 1, the optical scanner 4 is provided with a correcting lens 43 and reflecting mirrors 45, 46 in order that the laser beam, which is directed downwardly by the reflecting mirror 44, is directed to the photosensitive drum 61. The respective members are appropriately attached to a case 101. Details of the arrangement of the light source apparatus 100 will be described later on.

The process cartridge 5 is arranged under or below the optical scanner 4. The process cartridge 5 is detachably installed to the casing 2 from an opening formed when a front cover 21 provided for the casing 2 is opened. The process cartridge 5 includes a drum unit 6 and a development unit 7.

The drum unit 6 principally includes the photosensitive drum 61, a charger (an electrifier) 62, and a transfer roller 63. On the other hand, the development unit 7 is constructed so that the development unit 7 is detachably installed to the drum unit 6. The development unit 7 principally includes a developing roller 71, a supply roller 72, a layer thickness regulating blade 73, and a toner-accommodating section 74 for accommodating the toner (developer).

In the process cartridge 5, the surface of the photosensitive drum 61 is uniformly electrified or charged by the charger 62, and then the surface of the photosensitive drum 61 is exposed by means of the high speed scanning with the laser beam allowed to come from the optical scanner 4. Accordingly, an electrostatic latent image, which is based on the image data, is formed on the photosensitive drum 61. On the other hand, the toner, which is contained in the toner-accommodating section 74, is supplied to the developing roller 71 by the aid of the supply roller 72. The toner enters the space between the developing roller 71 and the layer thickness regulating blade 73, and the toner is carried as a thin layer having a constant thickness on the developing roller 71.

The toner, which is carried on the developing roller 71, is supplied from the developing roller 71 to the electrostatic latent image formed on the photosensitive drum 61. Accordingly, the electrostatic latent image is converted into a visual image, and a toner image is formed on the photosensitive drum 61. After that, the recording paper P is transported between the photosensitive drum 61 and the transfer roller 63, and thus the toner image on the photosensitive drum 61 is transferred onto the recording paper P.

The fixing apparatus 8 is provided at the back of the process cartridge 5. The toner image (toner), which has been transferred onto the recording paper P, is allowed to pass through the fixing apparatus 8, and thus the toner image (toner) is thermally fixed on the recording paper P. The recording paper P, on which the toner image has been thermally fixed, is discharged onto a paper discharge tray 22 by means of transport rollers 23, 24.

Detailed Arrangement of Light Source Apparatus

Figure 3:
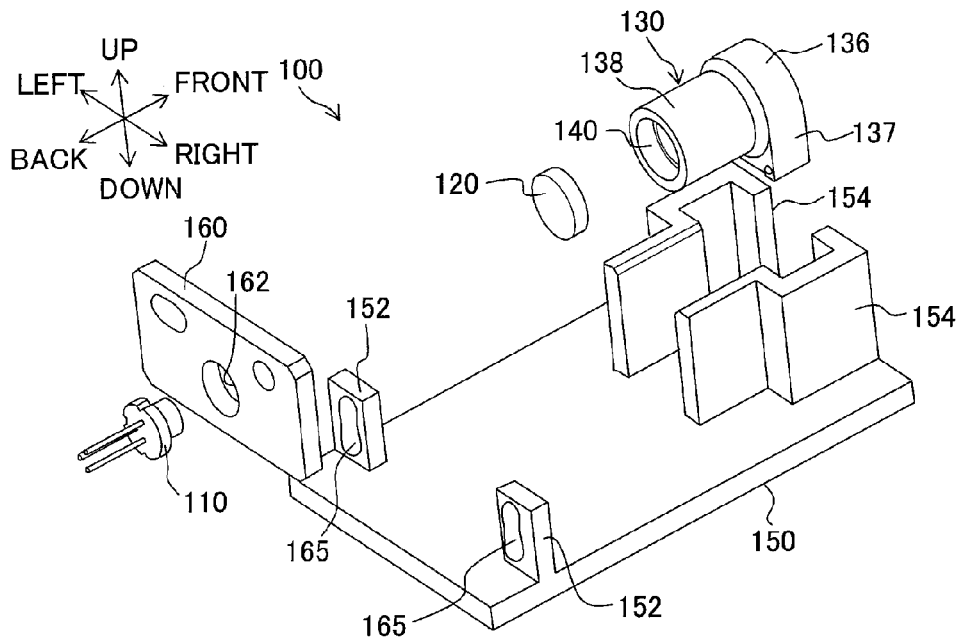
FIG. 3 shows an exploded perspective view illustrating a light source apparatus of the embodiment of the present invention.

As shown in FIG. 3, the light source apparatus 100 is provided with a semiconductor laser 110 which emits the laser beam (including one or more laser beams), a coupling lens (collimator lens) 120 which converts the diffused light emitted from the semiconductor laser 110 into the light flux (including one or more light fluxes) that is substantially parallel light beam, a cylindrical lens 130 into which the laser beam (the light flux) from the coupling lens 120 enters, and a base 150 which holds the respective parts. Regarding the definition of the direction, the respective directions of "front", "back", "left", "right", "up", and "down" are defined based on the light-exit direction (outgoing direction) of the laser beam from the semiconductor laser 110, the light-exit direction being assigned to the frontward direction as shown in FIG. 3.

Figure 4:
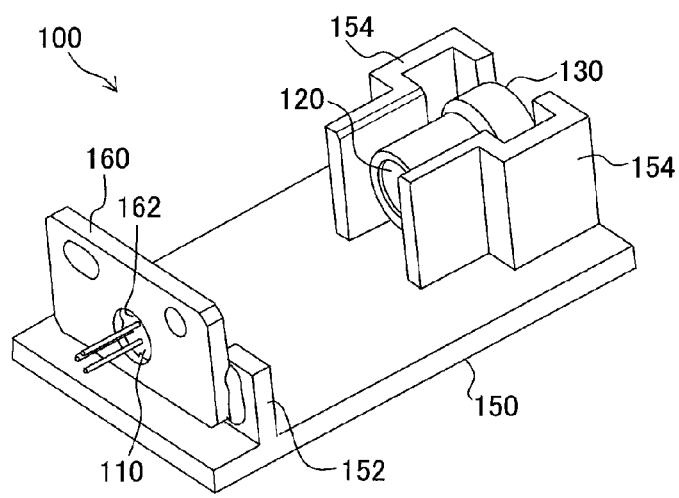
FIG. 4 shows a perspective view illustrating a state in which the light source apparatus is assembled.

As shown in FIG. 4, the semiconductor laser 110 is fixed to a circular opening 162 of a plate-shaped holder 160 composed of resin by means of, for example, the press-in or forcible insertion. The holder 160 is adhered with an adhesive 165 to two positioning projections 152, 152 disposed on the left and right sides of the base 150, and thus the holder 160 is fixed at a predetermined position on the base 150.

Figure 6:
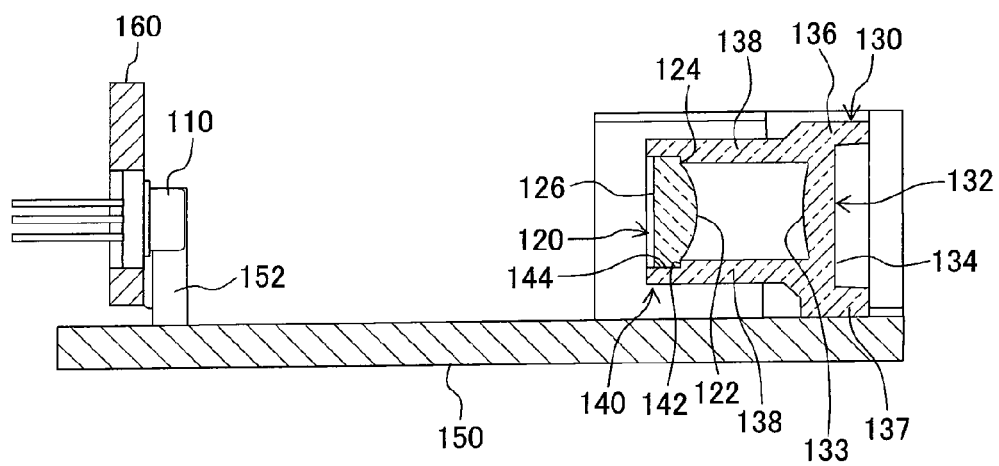
FIG. 6 shows a sectional view taken along a line VI-VI shown in FIG. 5.
Figure 7A:
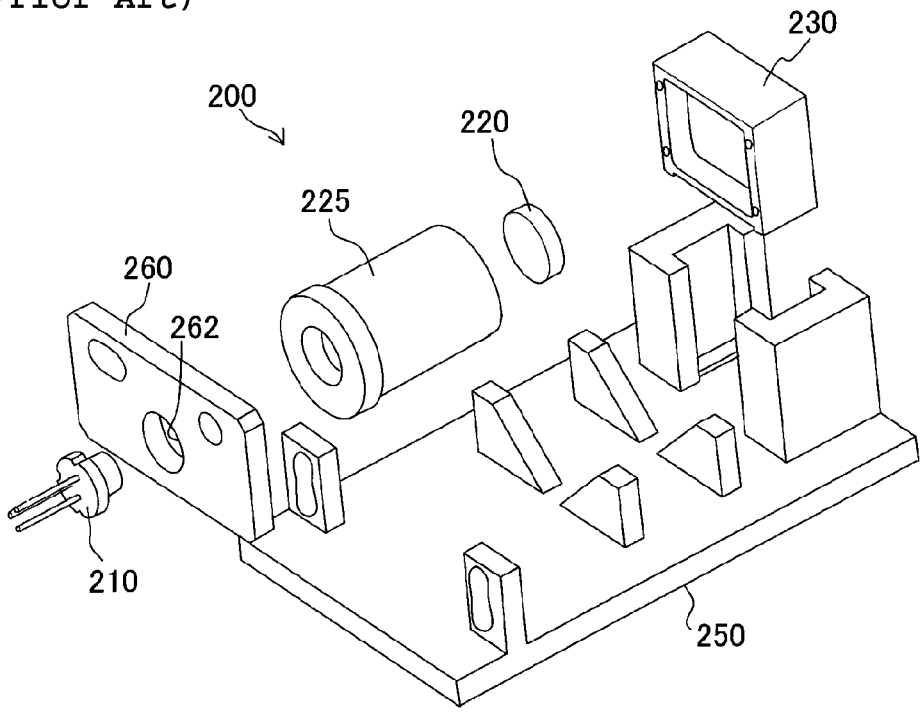
Figure 7B:
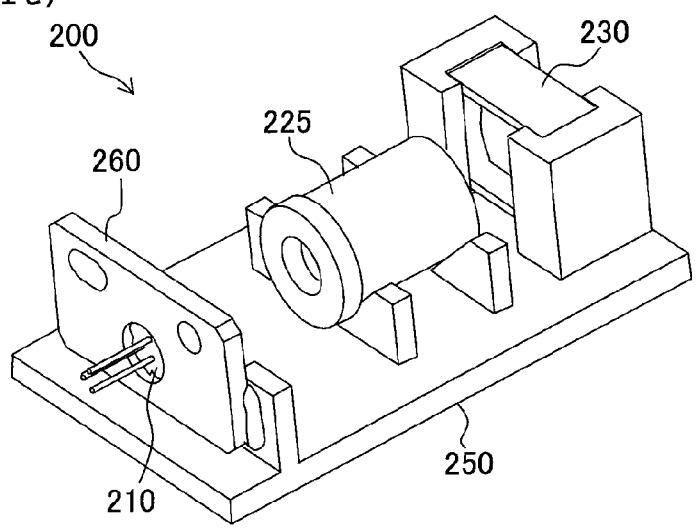

The coupling lens 120 is a disk-shaped convex lens composed of, for example, resin or glass. The laser beam, which is emitted from the semiconductor laser 110, is converged and converted into the light flux by the coupling lens 120. As shown in FIG. 6, the light-exit surface 122 of the coupling lens 120 is a convex curved surface, and the light-incident surface 120 is a flat surface. A flat surface portion 124, which is perpendicular to the optical axis, is formed at the edge portion of the light-exit surface 122. The flat surface portion 124 abuts against an annular support surface 142 of a lens holding portion 140 formed at one end of the support portion 138 of the cylindrical lens 130 as described later on to serve as the reference surface when the positional adjustment is performed in the optical axis direction with respect to a lens portion 132 of the cylindrical lens 130. The precision is required for the coupling lens 120. The coupling lens 120 has a large curvature as compared with the cylindrical lens 130, and the coupling lens 120 is affected by the thermal expansion more greatly. Therefore, it is desirable that the coupling lens 120 is made of glass. In this specification, the glass is not limited to any glass of any specified type. It is possible to use various glass materials including, for example, quartz glass or silica glass.

The laser beam, which has passed through the coupling lens 120, is guided by the cylindrical lens 130 to the polygon mirror 20 as a linear image extending in the main scanning direction (direction perpendicular to the paper surface of FIG. 6). The cylindrical lens 130 includes the lens portion 132, an outer circumferential portion 136 which is arranged at the outer circumference of the lens portion 132, and a support portion 138 which extends from the outer circumferential portion 136 toward the semiconductor laser 110. The cylindrical lens 130 is formed by integrally forming or molding these components with transparent resin.

The lens portion 132 is circular as viewed in the front-back direction, and the lens portion 132 includes an area through which the laser beam having passed through the coupling lens 120 is allowed to pass. As shown in FIG. 6, the light-incident surface 133 of the lens portion 132 is a convex curved surface, and the light-exit surface 134 is a flat surface.

The outer circumferential portion 136 is formed integrally with the lens portion 132 in an area through which the laser beam coming from the coupling lens 120 is not allowed to pass. The outer circumferential portion 136 has a cylindrical shape. As shown in FIGS. 3 and 6, the outer circumferential portion 136 is provided with regulating portions 137 which extend perpendicularly in the downward direction from the lower circumferential surface in order to regulate the rotation of the cylindrical lens 130 about the center of the optical axis. Owing to the provision of the regulating portions 137, it is possible to avoid the rotation of the cylindrical lens 130 about the center of the optical axis and it is possible to avoid the inclination of the linear image.

The support portion 138 is formed integrally with the outer circumferential portion 136 with a tapered surface intervening therebetween. The support portion 138 is a cylindrical member having a diameter smaller than that of the outer circumferential portion 136. The support portion 138 has a lens holding portion 140 which is disposed at a backward end portion (end portion positioned on the side of the semiconductor laser 110).

The lens holding portion 140 is provided in order to hold the coupling lens 120 at a predetermined position. As shown in FIG. 6, the lens holding portion 140 is provided with the annular support surface 142 which is provided to position the coupling lens 120 in the optical axis direction, and an inner circumferential portion 144 which is provided to adjust the optical axis of the coupling lens 120 with respect to the optical axis of the cylindrical lens 130. In particular, the lens holding portion 140 is formed so that the inner diameter of the lens holding portion 140 is slightly greater than the inner diameter of the central portion of the support portion 138 in the front-back direction. The annular support surface 142 is formed at the stepped portion (difference in dimension) between the inner diameters of the lens holding portion 140 and the central portion of the support portion 138. The fitting between the inner circumferential portion 144 of the lens holding portion 140 and the outer circumference of the coupling lens 120 are adjusted to such an extent that the coupling lens 120, which is inserted into the lens holding portion 140, is held without being wobbled. Therefore, when the coupling lens 120 is inserted from the side of the lens holding portion 140 of the cylindrical lens 130, and the flat surface portion 124 of the coupling lens 120 is allowed to abut against the annular support surface 142, then the optical axes are adjusted and the positions are determined in the optical axis direction between the coupling lens 120 and the lens portion 132 of the cylindrical lens 130. The outer surfaces of the outer circumferential portion 136 and the support portion 138 of the cylindrical lens 130 may be colored black (color to absorb the laser beam) to provide the light-shielding function.

Figure 5:
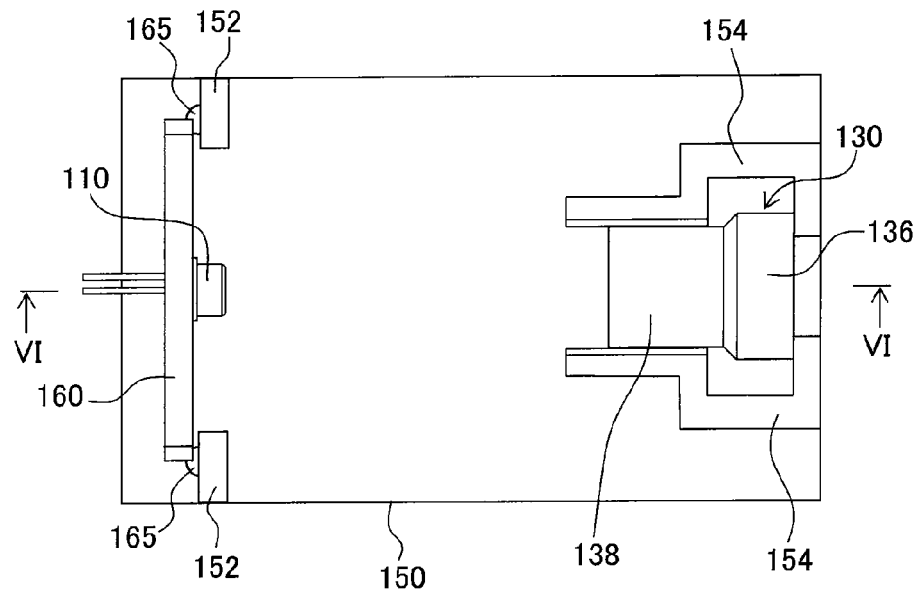
FIG. 5 shows a plan view illustrating the light source apparatus.

The base 150 is formed of resin in the same manner as the holder 160. As shown in FIGS. 3 and 4, the base 150 is provided with two left and right positioning projections 152 which are located on one end side (backward end side) in order that the holder 160, to which the semiconductor laser 110 is fixed, is positioned at a predetermined position, and the base 150 is provided with two left and right circumferential walls 154 which are provided on the other end side (front end side) in order that the cylindrical lens 130 is positioned at a predetermined position. As shown in FIG. 5, the two circumferential walls 154 are provided so that a spacing distance is formed between the two circumferential walls 154. The cylindrical lens 130 is arranged in a space surrounded by the circumferential walls 154. In particular, the space, which is surrounded by the two circumferential walls 154, is formed to correspond to the shape of the cylindrical lens 130. When the cylindrical lens 130 is positioned in the space in a state in which the regulating portions 137 are directed downwardly, the cylindrical lens 130 can be positioned at the predetermined position.

When the light source apparatus 100 constructed as described above is assembled, the coupling lens 120 is firstly fixed to the lens holding portion 140 formed at one end of the support portion 138 of the cylindrical lens 130 by means of the mutual fitting. The cylindrical lens 130 is positioned in the space surrounded by the two circumferential walls 154 on the base 150 in the state in which the regulating portions 137 are directed downwardly, and the cylindrical lens 130 is fixed with an adhesive. Subsequently, the semiconductor laser 110 is fixed by the press-in or forcible insertion into the circular opening 162 of the holder 160. An adhesive 165 of photo-curable resin is applied to the two left and right positioning projections 152 of the base 150 to fix the holder 160 to which the semiconductor laser 110 is fixed. During this process, the positioning adjustment is performed for the holder 160 while gripping the holder 160 by a robot hand (not shown). While the holder 160 is gripped by the robot hand, the light is emitted by the semiconductor laser 110 to confirm the focal point of the laser beam allowed to pass through the coupling lens 120 and the cylindrical lens 130. When the adhesive 165 is cured by radiating the ultraviolet light onto the photo-curable resin after the completion of the positioning adjustment for the holder 160, the light source apparatus 100 is completely assembled.

According to the light source apparatus 100 of the embodiment of the present invention, it is possible to provide the following effect. The coupling lens 120 is directly supported by the cylindrical lens 130. Therefore, the coupling lens 120 and the cylindrical lens 130 can be fixed to the base 150 within a range of small error as compared with a case in which the respective lenses are supported by any other holding member provided between the respective lenses and the base 150. After the positional adjustment is performed for the semiconductor laser 110 in this state, the semiconductor laser 110 is fixed to the base 150. Therefore, the laser beam, which is emitted from the semiconductor laser 110, can be condensed or concentrated at the correct position with respect to the polygon mirror 20. In other words, it is possible to concentrate or condense the light at a high accuracy.

The lens portion 132, the outer circumferential portion 136, and the support portion 138 of the cylindrical lens 130 are formed by means of the integrated formation (molding) with the transparent resin. Therefore, the cylindrical lens 130 can be produced with ease. The term "transparent" herein means the fact that the laser beam is transmitted. The cylindrical lens 130 has the small curvature of the convex curved surface as compared with the coupling lens 120, and the precision is not required for the cylindrical lens 130 to an extent equivalent to that required for the coupling lens 120. Therefore, even when the cylindrical lens 130 is formed of the resin, it is possible to obtain the sufficient performance. On the other hand, the coupling lens 120 has the large curvature of the convex curved surface, and the precision is required therefor. Therefore, it is desirable that the coupling lens 120 is formed of the glass.

The support portion 138 of the cylindrical lens 130 is cylindrical, and the coupling lens 120 is supported in the lens holding portion 140 of the support portion 138 by means of the mutual fitting. Therefore, the optical axes of the coupling lens 120 and the cylindrical lens 130 can be easily adjusted to coincident with each other. In general, the coupling lens 120 has a circular cross-sectional shape. Therefore, when the lens holding portion 140 of the support portion 138 is cylindrical, the coupling lens 120 can be accurately supported in the lens holding portion 140. When the support portion 138 is cylindrical, the resin shrinks equivalently during the injection molding. Therefore, it is possible to decrease the dimensional error at the lens holding portion 140.

Owing to the provision of the regulating portions 137 at the outer circumferential portion 136 of the cylindrical lens 130, it is possible to regulate or restrict the rotation of the cylindrical lens 130 about the center of the optical axis by merely positioning the cylindrical lens 130 at the predetermined position on the base 150 in the state in which the regulating portions 137 are directed downwardly. Therefore, it is possible to avoid the inclination of the linear image allowed to come from the cylindrical lens 130 with respect to the polygon mirror 20.

The outer diameter of the support portion 138 of the cylindrical lens 130 is smaller than the outer diameter of the outer circumferential portion 136. Therefore, the regulating portions 137 are easily manufactured.

The embodiment of the present teaching has been explained above. However, the present teaching can be carried out while being appropriately modified, without being limited to the embodiment described above.

For example, the support portion 138 of the cylindrical lens 130 can be also constructed as a rod-shaped or plate-shaped member extending from a lower portion of the outer circumferential portion 136 toward the semiconductor laser 110 to provide a positioning portion for positioning the coupling lens 120. Further, the lens holding portion 140 for holding the coupling lens 120 can be also provided on an inner side as compared with the end portion of the support portion 138.

In the embodiment described above, the cylindrical lens 130 is constructed to be cylindrical, and the regulating portions 137 are provided on the outer circumference of the outer circumferential portion 136. However, the lens portion 132 and the outer circumferential portion 136 of the cylindrical lens 130 may be box-shaped such as rectangular parallelepiped-shaped, and the lens portion 132 and the outer circumferential portion 136 may be constructed integrally with the cylindrical support portion 138 as well. When the outer circumferential portion 136 is box-shaped with a flat surface provided at the lower end thereof, it is possible to regulate the rotation about the center of the optical axis of the cylindrical lens 130 by merely placing the cylindrical lens 130 at a predetermined position on the base 150. Therefore, it is unnecessary to provide any regulating portion. Further, the shape of the coupling lens 120 is not limited to the disk-shaped form as well, which can be appropriately changed. When the support portion 138 of the cylindrical lens 130 is formed to be cylindrical, it is desirable to provide a cross-sectional shape adjusted to the outer shape of the coupling lens 120.

In the embodiment described above, the coupling lens 120 is fixed to the cylindrical lens 130 by means of the mutual fitting. However, the coupling lens 120 can be also fixed to the cylindrical lens 130 by means of, for example, the press-in or forcible insertion, the fixation with an adhesive, and the fixation by the welding. For example, the inner diameter of the lens holding portion 140 may be increased to provide such an arrangement that at least three or more press-in projections, which protrude inwardly from the inner circumferential surface of the lens holding portion 140, are provided. Further, the coupling lens 120 can be also fixed to the cylindrical lens 130 so that a plurality of projections, which protrude from the inner circumferential surface of the support portion 138 and which abut against the flat surface portion 124 of the coupling lens 120, are provided and an adhesive is applied to the projections, without providing the annular support surface 142.

In the embodiment described above, the holder 160 and the base 150 are formed of the resin. However, the holder 160 and the base 150 can be also formed by performing the die-cast forming with a metal such as an aluminum alloy or the like. In the embodiment described above, the optical scanner 4 is provided with the light source apparatus 100, the polygon mirror 20, the fθ lens 42, and the reflecting mirror 44. However, the present teaching is not necessarily limited to this arrangement. The optical scanner according to the present teaching is appropriately provided with the light source apparatus according to the present teaching, the optical deflector such as a polygon mirror, an oscillating mirror or the like, and the scanning lens such as an fθ lens or the like.

What is claimed is:

1. A light source apparatus comprising:
   a semiconductor laser configured to emit a laser beam;
   a coupling lens configured to convert the laser beam emitted from the semiconductor laser into a light flux;
   a cylindrical lens assembly into which the light flux from the coupling lens enters, the cylindrical lens assembly including:
     a lens portion;
     an outer circumferential portion which is arranged at an outer circumference of the lens portion; and
     a support portion which extends from the outer circumferential portion toward the semiconductor laser and which supports the coupling lens, the support portion having a cylindrical shape with a central axis which coincides with an optical axis of the coupling lens; and
   a base configured to support the semiconductor laser and the coupling lens, and including first, second and third walls, the second and third walls extending in a first direction orthogonal to the first wall, and the second and third walls being arranged with a gap in a second direction orthogonal to the optical axis,
   wherein the outer circumferential portion is arranged with a gap between the outer circumferential portion and the first wall in the first direction,
   wherein the lens portion, the outer circumferential portion, and the support portion are seamlessly connected with each other,
   wherein a length of the support portion, which is measured in a direction that is parallel to the second direction and passes through the optical axis, is shorter than a length of the outer circumferential portion, which is measured in the direction that is parallel to the second direction and passes through the optical axis, wherein the cylindrical lens assembly is arranged between the second and third walls in the second direction, wherein each of the second and third walls includes a first portion, which is configured to support the support portion in the second direction, a second portion, which is located at a more downstream side than the first portion in a light-traveling direction of the light flux, and a third portion connecting the first portion with the second portion and being located at a more downstream side than the first portion in the light traveling direction of the light flux, wherein the second portion is arranged such that a gap is formed between the second portion and the outer circumferential portion in the second direction, and wherein the outer circumferential portion includes a regulating surface that is parallel to the first wall and that is configured to regulate rotation of the cylindrical lens assembly about the optical axis of the cylindrical lens assembly.

2. The light source apparatus according to claim 1, wherein the lens portion and the coupling lens are formed of different materials.

3. The light source apparatus according to claim 1, wherein the lens portion is formed of transparent resin, and the coupling lens is formed of glass.

4. The light source apparatus according to claim 1, wherein the lens portion, the outer circumferential portion and the support portion of the cylindrical lens assembly are integrally formed of resin.

5. The light source apparatus according to claim 1, wherein the coupling lens is supported in the support portion.

6. The light source apparatus according to claim 1, wherein the outer circumferential portion of the cylindrical lens assembly is cylindrical.

7. The light source apparatus according to claim 5, wherein the outer circumferential portion is cylindrical, and an outer diameter of the support portion is smaller than an outer diameter of the outer circumferential portion.

8. An optical scanner comprising:
the light source apparatus as defined in claim 1 which is configured to emit the light flux of the laser beam;
an optical deflector configured to perform scanning with the light flux; and
a scanning lens configured to perform imaging with the light flux.

9. The optical scanner according to claim 8, wherein the optical deflector is a polygon mirror, and the scanning lens is an fθ lens.

10. A light source apparatus comprising:
a semiconductor laser configured to emit a laser beam;
a coupling lens configured to convert the laser beam emitted from the semiconductor laser into a light flux;
a cylindrical lens unit into which the light flux from the coupling lens enters, the cylindrical lens unit including:
a lens portion;
an outer circumferential portion having a cylindrical shape which is arranged around an outer circumference of the lens portion; and
a support portion which extends from the outer circumferential portion toward the semiconductor laser and which supports the coupling lens, the support portion having a cylindrical shape with a central axis which coincides with an optical axis of the coupling lens; and a base configured to support the semiconductor laser and the coupling lens, and including first, second and third walls, the second and third walls extending in a first direction orthogonal to the first wall, and the second and third walls being arranged with a gap in a second direction orthogonal to the optical axis, wherein each of the second and third walls includes a first portion, which is configured to support the support portion in the second direction, a second portion, which is located at a more downstream side than the first portion in a light-traveling direction of the light flux, and a third portion connecting the first portion with the second portion and being located at a more downstream side than the first portion in the light traveling direction of the light flux, and wherein the cylindrical lens unit includes the lens portion, the outer circumferential portion, and the support portion seamlessly connected with each other.

11. The light source apparatus according to claim 10, wherein the lens portion and the coupling lens are formed of different materials.

12. The light source apparatus according to claim 10, wherein the lens portion is formed of transparent resin, and the coupling lens is formed of glass.

13. The light source apparatus according to claim 10, wherein the lens portion, the outer circumferential portion and the support portion of the cylindrical lens unit are integrally formed of resin.

14. The light source apparatus according to claim 10, wherein the coupling lens is supported in the support portion.

15. The light source apparatus according to claim 10, wherein a regulating portion, which regulates rotation of the cylindrical lens about a center of an optical axis of the cylindrical lens, is provided on an outer circumference of the outer circumferential portion.

16. The light source apparatus according to claim 14, wherein an outer diameter of the support portion is smaller than an outer diameter of the outer circumferential portion.

17. An optical scanner comprising:
the light source apparatus as defined in claim 10 which is configured to emit the light flux of the laser beam;
an optical deflector configured to perform scanning with the light flux; and
a scanning lens configured to perform imaging with the light flux.

18. The optical scanner according to claim 17, wherein the optical deflector is a polygon mirror, and the scanning lens is an fθ lens.

19. A light source apparatus comprising:
a semiconductor laser configured to emit a laser beam;
a coupling lens configured to convert the laser beam emitted from the semiconductor laser into a light flux;
a cylindrical lens unit into which the light flux from the coupling lens enters, the cylindrical lens unit including:
a lens portion into which the light flux from the coupling lens enters;
an outer circumferential portion which is arranged at an outer circumference of the lens portion and of which diameter is larger than a diameter of the lens portion; and
a hollow support portion that extends from the outer circumferential portion toward an upstream side in a light-traveling direction of the laser beam and that is configured to support an outer circumference of the coupling lens, the hollow support portion having a cylindrical shape with a central axis that coincides with an optical axis of the coupling lens, and a base configured to support the semiconductor laser and the coupling lens, wherein the base includes a first wall, a second wall, and a third wall wherein:
the second and third walls extend in a first direction orthogonal to the first wall,
the first wall is arranged such that there is a gap between the outer circumferential portion and the first wall in the first direction,
the second and third walls are arranged such that there is a gap in a second direction orthogonal to the optical axis to sandwich the cylindrical lens unit,
each of the second and third walls includes a first portion, which is configured to support the support portion in the second direction, a second portion, which is located at a more downstream side than the first portion in a light-traveling direction of the light flux, and a third portion connecting the first portion with the second portion and being located at a more downstream side than the first portion in the light traveling direction of the light flux, and
the second portion is arranged such that there is a gap between the second portion and the outer circumferential portion in the second direction,
wherein the outer circumferential portion includes a regulating surface that is parallel to the first wall and configured to regulate rotation of the cylindrical lens unit about the optical axis of the cylindrical lens unit, and
wherein the lens portion, the outer circumferential portion, and the hollow support portion are seamlessly connected with each other.

* * * * *